United States Patent [19]

Ranby et al.

[11] 4,446,048

[45] May 1, 1984

[54] LUMINESCENT MATERIALS

[75] Inventors: Peter W. Ranby, Middlesex; David R. Palowkar, London, both of England

[73] Assignee: Thorn Emi Limited, London, England

[21] Appl. No.: 324,026

[22] Filed: Nov. 23, 1981

[30] Foreign Application Priority Data

Nov. 25, 1980 [GB] United Kingdom ................ 8037726

[51] Int. Cl.$^3$ ........................................... C09K 11/463
[52] U.S. Cl. ............................. 252/301.4 S; 313/486
[58] Field of Search .................. 252/301.4 S; 313/486

[56] References Cited

U.S. PATENT DOCUMENTS 3,650,976  3/1972  Luckey ........................ 252/301.4 S
4,007,394  2/1977  Rabatin ............................... 313/486

FOREIGN PATENT DOCUMENTS 22024     9/1961  Fed. Rep. of Germany ... 252/301.4 S
42-13692  8/1967  Japan ............................ 252/301.4 S
650491    2/1951  United Kingdom .
1275169   5/1972  United Kingdom .

OTHER PUBLICATIONS

Peters "J. Electrochem. Soc.", vol. 116, No. 7, pp. 985–989, 1969.

Primary Examiner—Jack Cooper
Attorney, Agent, or Firm—Fleit, Jacobson, Cohn & Price

[57] ABSTRACT

A phosphor for use in fluorescent lamps which comprises calcium sulphate and, optionally, up to 50% of strontium sulphate together with cerium (0.5–10%), manganese (up to 10%), an alkali metal (0.001 to 3%) and boron and/or aluminium (0.001 to 8%). The phosphor may be produced by blending and then firing the individual components. Tubes for use in the lamps may be electrostatically coated with the phosphor.

12 Claims, No Drawings

LUMINESCENT MATERIALS

This invention relates to inorganic luminescent materials suitable for use in fluorescent lamps, where the materials are normally excited by ultra-violet radiation. Certain of the materials of our invention are useful in that, under these conditions, they emit in the visible spectrum, preferably in the green or green/yellow part of that spectrum and thus can be used for general illumination and certain others of our materials are useful in that they emit ultra-violet radiation of longer wavelength than the exciting radiation and thus can be used for other applications, for example in connection with photocopying apparatus. The invention also relates to a method for producing the inorganic luminescent materials, and to fluorescent lamps incorporating these materials.

Luminescent materials are known wherein the host material, or matrix, is an alkaline earth sulphate. Normally this material is activated by one or more other elements; for example, British Specification Patent No. 650,491 describes such a material wherein the matrix is calcium sulphate and the activator may be selected from various elements including cerium and manganese, British Specification Patent No. 1,275,169 discloses alkaline earth sulphates activated by europium and U.S. Pat. No. 4,007,394 calcium sulphate activated by cerium and terbium. We have found that the above material made according to British Specification Patent No. 650,491 is not sufficiently bright for the commercial requirements of present day fluorescent lamps, whereas the above materials as described in British Specification Patent No. 1,275,169 and U.S. Pat. No. 4,007,394 are expensive to produce because they include the rare earth elements europium and terbium.

It is an object of the present invention to provide an inorganic luminescent material which is a bright emitter and which is comprised of relatively cheap and readily available materials.

Accordingly we provide an inorganic luminescent material for use in a fluorescent lamp which comprises a matrix of an alkaline earth sulphate wherein at least 50% weight equivalent of the alkaline earth is calcium but wherein up to 50% weight equivalent of the alkaline earth may be strontium, said matrix additionally comprising cerium, boron and/or aluminium, and an alkali metal selected from lithium, sodium, and potassium. The matrix may additionally include manganese.

We have found that one particularly suitable matrix is that comprising as the alkaline earth sulphate, calcium sulphate only. Useful brightly emitting luminescent materials are also produced when up to 50% weight equivalent of the calcium is replaced by strontium; it is found in this case that, as the amount of strontium is increased, so the wavelength of the emitted radiation becomes slightly longer.

The material of our invention may be prepared from an initial mixture of components comprising the appropriate alkaline earth sulphate and, as percentages by weight based on the weight of alkaline earth sulphate, from 0.5 to 10% of cerium, from 0.001 to 8% of boron and/or aluminium, from 0.001 to 3% of the alkali metal and up to 10% of manganese.

Alternatively, as will become apparent from the specific description hereinafter, the initial mixture of components may comprise a compound of the alkaline earth other than sulphate, for example the carbonate, together with excess of a suitable sulphate, e.g. ammonium sulphate, the sulphate being formed from these precursors during the preparation of the luminescent material. The constituents other than the alkaline earth may be present in the initial mixture in the form of suitable compounds such as the sulphate, carbonate, oxide or hydroxide.

The preferred phosphors of our invention have a well defined orthorhombic crystal structure, typical of that of anhydrite. The preferred percentage of cerium in the phosphor is from 1 to 8%. Cerium may conveniently be added to the initial mixture as cerium ammonium nitrate.

If it is required to produce a material which emits ultra-violet radiation of longer wavelength than the exciting radiation, then no manganese should be included in the material, but where emission in the visible light spectrum is required, preferably from 1 to 8% of manganese should be included in the phosphor. In general, the larger the amount of manganese, the longer the wavelength of the emitted radiation. For example, when excited by ultra-violet radiation of wavelength 253.7 nm, the emitted radiation will vary from green with the lesser amounts of manganese to green/yellow with the greater amounts. When added to the initial mixture, the manganese is preferably so added in the form of the sulphate.

Although the phosphor may contain from 0.1% to 3% of alkali metal when using our preferred alkali metal which is lithium, the preferred amount thereof in the resultant phosphor is from 0.001 to 0.5%; it may conveniently be added to the initial mixture as the sulphate.

Boron may conveniently be added to the initial mixture in the form of boric acid, but may alternatively be added as an ammonium or alkali metal borate. The resultant phosphor may contain from 0.1 to 8% boron.

Aluminium can conveniently be added to the initial mixture in the form of aluminium sulphate or as aluminium ammonium sulphate (ammonium alum). The preferred amount of boron and/or aluminium in the phosphor is from 0.001 to 0.5%.

To prepare the luminescent materials of the present invention the components of the initial mixture are blended together, preferably in conjunction with a grinding process. The blended mixture of materials is subjected to a firing process which should preferably be carried out under conditions which are not strongly oxidising, for example in a closed crucible. After firing, which, in the case where precursor materials are used, has the effect of forming, in situ, the desired alkaline earth sulphate, the materials is broken up into a fine powder. We have found that this breaking up can, with the materials of our invention, be very easily accomplished and that fine powders can be obtained without any necessity for severe mechanical working of the material. In a preferred method the fired material is merely immersed in a wash liquid when it immediately commences to crumble. Water may be successfully used as the wash liquid, but we find that particularly effective wash liquids are dilute acids such as hydrochloric acid or acetic acid. It is believed that the wash liquid also removes at least part of the excess of the materials other than the alkaline earth sulphate which have not been incorporated into the matrix.

The inorganic luminescent materials of our invention may be coated on the internal surface of glass tubes for use in fluorescent lamps. The method of coating preferably does not involve the use of an organic binder, the removal of which by the well known method of heat treatment under oxidising conditions somewhat reduces the brightness of the phosphor. Alternative coating methods, for example electrostatic coating methods are therefore preferred. In the latter case phosphors containing aluminium are found to be particularly suitable.

The invention is illustrated but in no way limited by the following Examples.

EXAMPLE 1

Calcium carbonate (55 g.), ammonium sulphate (100 g.), diammonium cerium hexanitrate (21 g.), manganous sulphate tetrahydrate (22.5 g.), lithium sulphate monohydrate (4 g.) and boric acid (12.4 g.) were ground together and fired for 1 hour at 800° C. in a closed silica crucible. The resultant product was ground with a further amount 20 g.) of ammonium sulphate, fired for a further 1 hour at 800° C. and placed in hot (70° C.) 2% acetic acid (500 ml.) when it crumbled to a fine powder. The fine powder was washed with water, dried and sieved. When excited by ultra-violet radiation of wavelength 253.7 nm, it emitted a bright yellowish green fluorescence.

EXAMPLE 2

The procedure of Example 1 was repeated except that the amount of manganous sulphate was reduced from 22.5 g. to 17.5 g. The resultant phosphor when excited by ultra-violet radiation of wavelength 253.7 nm had a bright green fluorescence which was less yellowish than the emitted by the phosphor of Example 1.

EXAMPLE 3

The procedure of Example 1 was repeated except that 10 g. of the calcium carbonate was replaced by a chemically equivalent amount (14.7 g.) of strontium carbonate. The resultant phosphor when excited by ultra-violet radiation of wavelength 253.7 nm had a bright yellow green fluorescence.

EXAMPLE 4

The procedure of Example 1 was repeated except that no manganese compound was included. The resultant product when excited by ultra-violet radiation of wavelength 253.7 nm emitted in the long wavelength ultra-violet region.

EXAMPLE 5

Anhydrous calcium sulphate (75 g.), ammonium sulphate (30 g.), diammonium cerium hexanitrate (15 g.) manganous sulphate tetrahydrate (22.5 g.), lithium sulphate monohydrate (4 g.) and boric acid (18.6 g.) were ground together and heated according to the procedure of Example 1. The resultant product when excited by ultra-violet radiation of wavelength 253.7 nm showed a bright yellowish green fluorescence.

EXAMPLE 6

Calcium carbonate (50 g.), ammonium sulphate (90 g.), diammonium cerium hexanitrate (5.5 g.), manganous sulphate tetrahydrate (16.8 g.). lithium sulphate monohydrate (3.2 g.) and aluminium ammonium sulphate dodecahydrate (22.6 g.) were ground, fired and worked up by the procedure of Example 1 to produce a phosphor which, when excited by ultraviolet radiation of wavelength 253.7 nm, emitted a bright yellowish green fluorescence.

What we claim is:

1. A phosphor for use in a fluorescent lamp which comprises an alkaline earth sulphate of which at least 50% of the alkaline earth of said alkaline earth sulphate is calcium but wherein up to 50% of the alkaline earth of said alkaline earth sulfate may be strontium, with the balance of said alkaline earth being calcium, and which additionally contains the following percentages by weight of the alkaline earth sulphate
   (a) from 0.5 to 10 of cerium,
   (b) up to 10 of manganese,
   (c) from 0.001 to 3 of an alkali metal selected from lithium, sodium and potassium, and
   (d) from 0.001 to 8 of boron.

2. A phosphor according to claim 1 whenever of orthorhombic crystal structure.

3. A phosphor according to claim 1 wherein the alkaline earth sulphate consists of calcium and strontium sulfate.

4. A phosphor according to claim 1 wherein the alkaline earth sulphate consists of calcium sulphate.

5. A phosphor according to claim 1 which contains from 1% to 8% by weight of the alkaline earth sulphate of cerium.

6. A phosphor according to claim 1 which contains from 1% to 8% by weight of the alkaline earth sulphate of manganese.

7. A phosphor according to claim 1 which contains no manganese.

8. A phosphor according to claim 1 which contains from 0.1% to 3% by weight of the alkaline earth sulphate of alkali metal.

9. A phosphor according to claim 1 wherein the alkali metal is lithium.

10. A phosphor according to claim 9 which contains from 0.001% to 0.5% by weight of the alkaline earth sulphate of lithium.

11. A phosphor according to claim 1 which contains from 0.001% to 0.5% by weight of the alkaline earth sulphate of boron.

12. A phosphor according to claim 1 which contains from 0.1% to 8% by weight of the alkaline earth sulphate of boron.

* * * * *